United States Patent [19]

Abe et al.

[11] 4,009,929
[45] Mar. 1, 1977

[54] BINOMIAL MICROSCOPE

[75] Inventors: Kuniomi Abe, Kobe; Yuji Maekawa, Nishinomiya, both of Japan

[73] Assignee: Konan Camera Research Institute, Nishinomiya, Japan

[22] Filed: Sept. 30, 1975

[21] Appl. No.: 618,058

[30] Foreign Application Priority Data

Apr. 24, 1975  Japan .................. 50-56684[U]

[52] U.S. Cl. .................. 350/35; 350/139
[51] Int. Cl.² .................. G02B 21/22
[58] Field of Search .................. 350/33, 35, 75, 76, 350/139, 145

[56] References Cited
UNITED STATES PATENTS 3,434,772  3/1969  Fogle .................. 350/35

FOREIGN PATENTS OR APPLICATIONS 907,679  10/1962  United Kingdom .................. 350/35

Primary Examiner—Edward S. Bauer
Assistant Examiner—Matthew W. Koren
Attorney, Agent, or Firm—Eugene E. Geoffrey, Jr.

[57] ABSTRACT

A binomial microscope which includes an auxiliary objective and a pair of parallel optical axes each having objective and ocular lenses and means for moving the objective lenses perpendicular to their optical axes to form the observed image substantially coincident with the object being observed.

1 Claim, 4 Drawing Figures

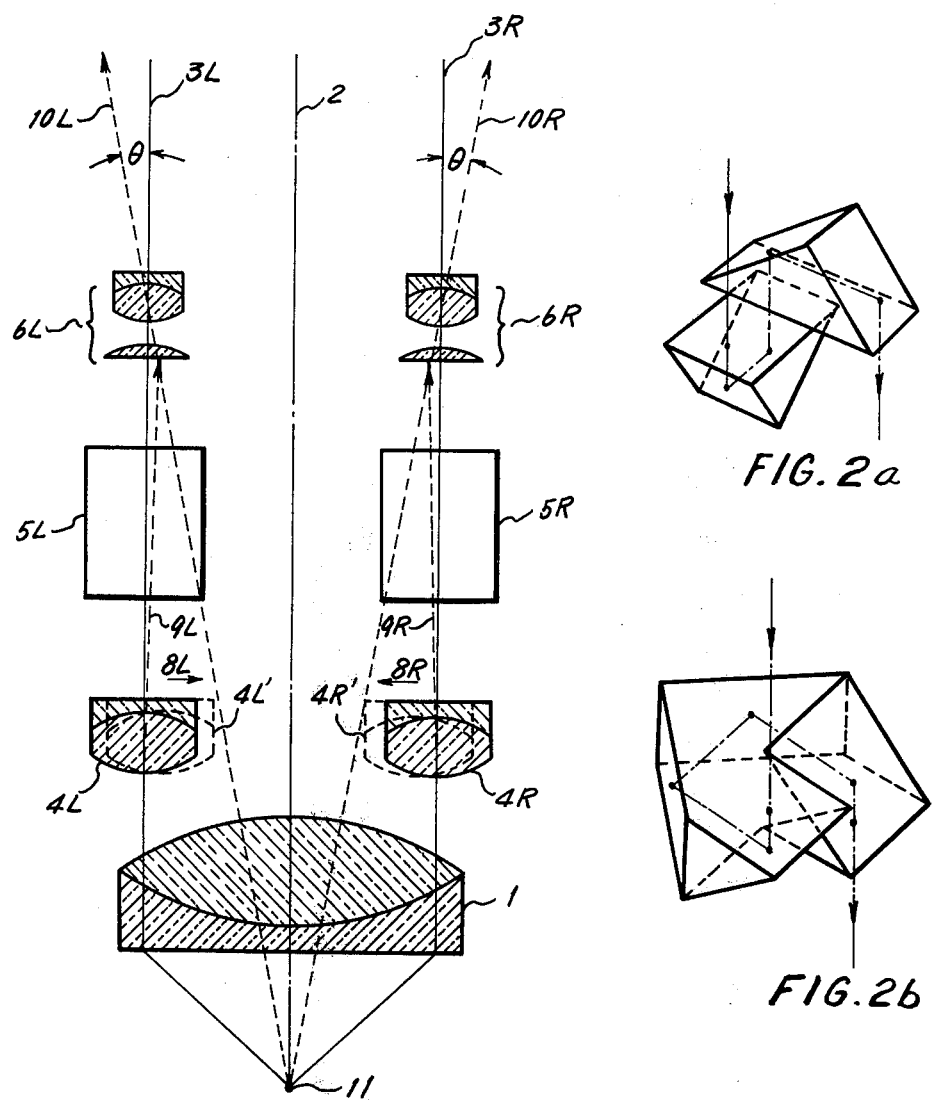
FIG. 1
FIG. 2a
FIG. 2b
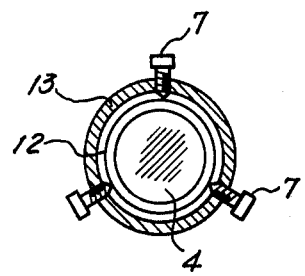
FIG. 3

BINOMIAL MICROSCOPE

This invention relates to an improved binomial microscope, and more specifically to an improved structure therefor.

There are two types of binomial microscopes, one having a pair of microscopes arranged to have their optical axes intersecting in the vicinity of the object, while the other arranged to have parallel optical axes. The former type has the disadvantage in that it is difficult to assemble though the parallax between the both eyes is unchanged even in case of repeating alternation of direct observation by the naked eyes and microscopic observation. Contrarily, the latter one has the disadvantage that the observer is fatigued by the parallax between the both eyes varying between the two modes of observation, although it can be easily assembled.

Accordingly, an object of this invention is to provide an improved binomial microscope which can be easily assembled and also can form an observed image in the vicinity of the object to be observed.

This object can be attained in accordance with this invention in which the microscope comprises an auxiliary objective arranged in the rear of the object to be observed and a pair of optical systems having substantially parallel optical axes and being arranged in the rear of the auxiliary objective and each system includes an objective, an ocular and an adjusting mechanism for moving the objective in the direction perpendicular to the optical axis.

The above and other objects and advantage of this invention will be described in detail hereinunder with reference to the accompanying drawings.

In the drawings:

FIG. 1 is a schematic diagram representing a structural configuration of an embodiment of binomial microscope according to this invention;

FIGS. 2(a) and 2(b) are perspective views representing two examples of the erect prism of FIG. 1; and FIG. 3 is a sectional plan view representing an embodiment of supporting structure of the ocular of the device of FIG. 1.

In FIG. 1, like reference numerals are used to denote responding structural components and suffixes L and R are added thereto for distinguishing the lefthand and righthand optical systems. The binomial microscope in the drawing includes an auxiliary objective 1 having an optical axis 2 at the front end. Along a pair of optical axes 3L and 3R which are parallel with and symmetrical about the optical axis 2, there is arranged a pair of optical systems respectively comprising objectives 4L and 4R, erect prisms 5L and 5R and oculars 6L and 6R arranged in that order as shown.

Though the erect prisms 5L and 5R are shown as blocks in the drawing, they may be of any type of erect prism assembly which is well known in this field. FIGS. 2(a) and 2(b) represent two typical examples of erect prisms, which are known as Porro Types I and II respectively. According to this invention, as shown in FIG. 3, the objective 4 of each optical system, which is carried by a holder ring 12, is supported by screws 7 screwed in the casing 13 of the system, thereby enabling movement of the objective 4 in the paper plane which is perpendicular to the optical axis.

It is now assumed for simplification that the erect prisms 5L and 5R are removed or omitted from the drawing. If the objectives 4L and 4R are moved in the direction of arrows 8L and 8R perpendicularly to the optical axes 3L and 3R respectively as shown by dashed lines 4L' and 4R', the beams incident in the objectives 4L and 4R along the optical axes 3L and 3R refract out along the dashed lines 9L and 9R respectively deflecting from the optical axes 3L and 3R. This results in opposite declinations of the apparent optical axes 10L and 10R of the both optical systems. As the declination angle $\theta$ is a function of displacement of the both objectives 4L and 4R, the observed image can be formed at or near the object 11 by adjusting the displacement of the both objectives. In the practical case of the embodiment of FIG. 1 having the erect prisms 5L and 5R, the same effect is obtained by moving the objectives 4L and 4R in the directions opposite to the arrows 8L and 8R respectively, since the deflection of the beam is inverted once more by the erect prisms 5L and 5R.

As described above, the binomial microscope of this invention can form an observed image at or near the object to be observed, regardless of parallel arrangement of its reference optical axes. Although the objective moving means was described above as a screw mechanism, it should be understood that various mechanisms may be employed for this purpose. Moreover, though the above embodiment is provided with erect prisms, this invention may be embodied in those binomial microscopes not having erect prisms.

What is to be claimed:

1. A binomial microscope comprising an auxiliary objective and a pair of optical systems having substantially parallel optical axes and being arranged in the rear of said auxiliary objective, each of said optical systems including an objective and an ocular, and said optical system further includes means for moving said objective in the direction substantially perpendicular to said optical axis while maintaining the remaining optical elements in fixed positions.

* * * * *